March 6, 1934.  E. O. WOOD ET AL  1,950,204
FRUIT AND VEGETABLE DISPLAY STAND
Filed May 1, 1933  3 Sheets-Sheet 1
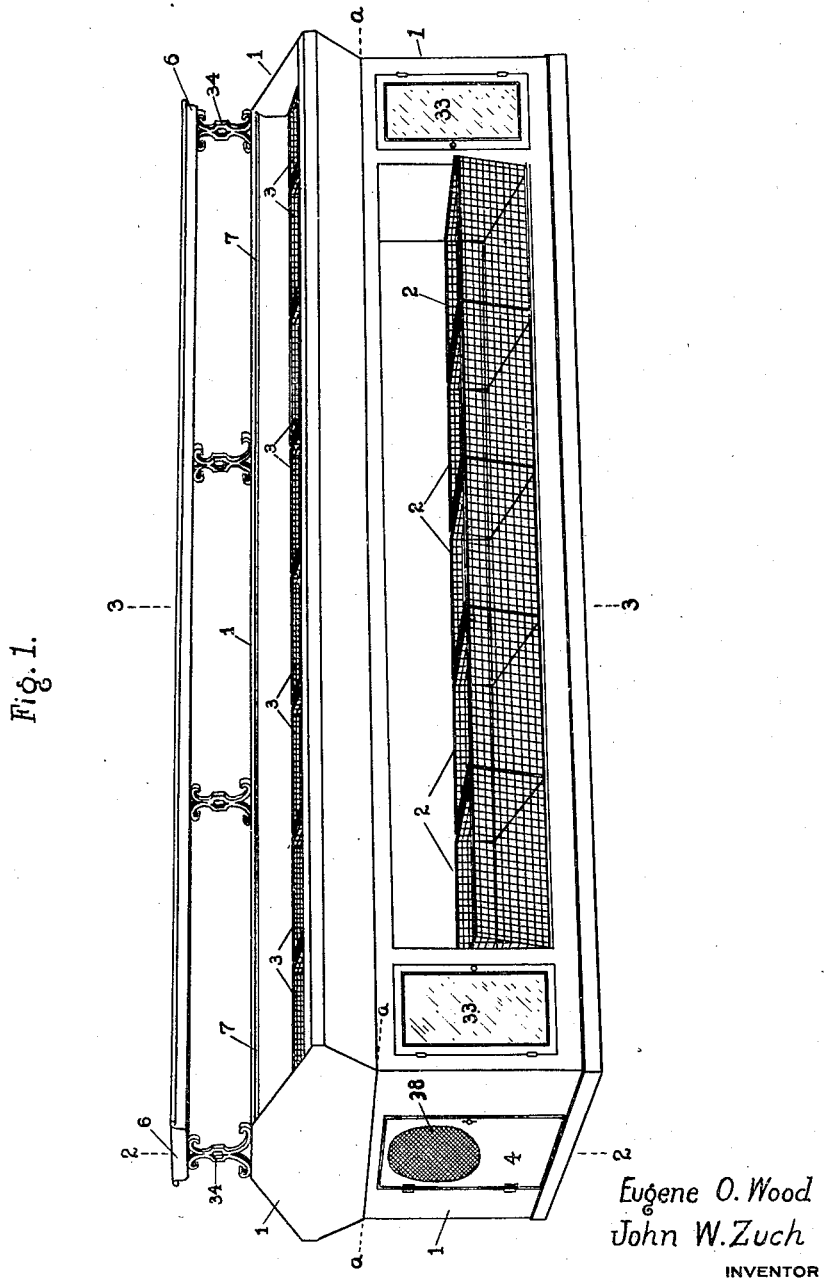
Eugene O. Wood
John W. Zuch
INVENTOR
BY Luke Williams
ATTORNEY March 6, 1934.  E. O. WOOD ET AL  1,950,204
FRUIT AND VEGETABLE DISPLAY STAND
Filed May 1, 1933  3 Sheets-Sheet 2
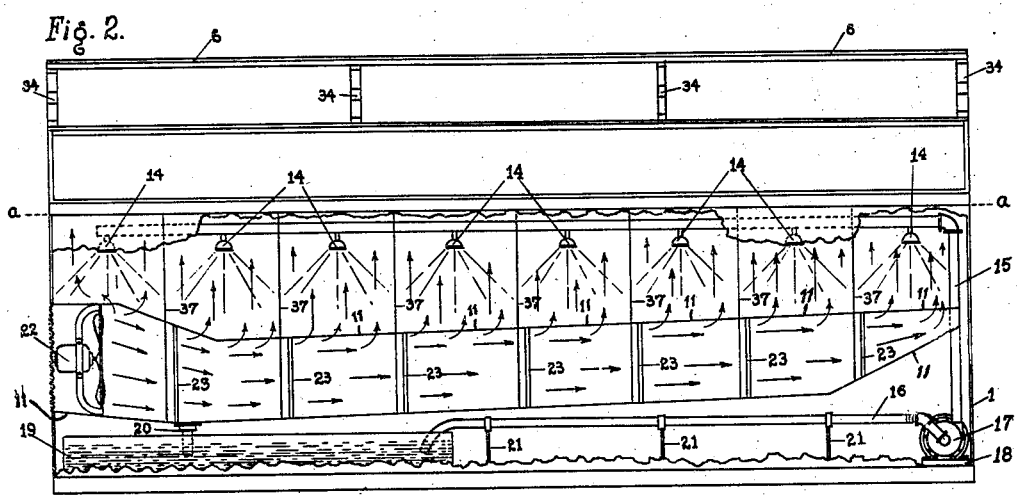
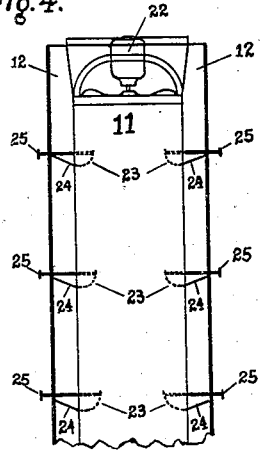
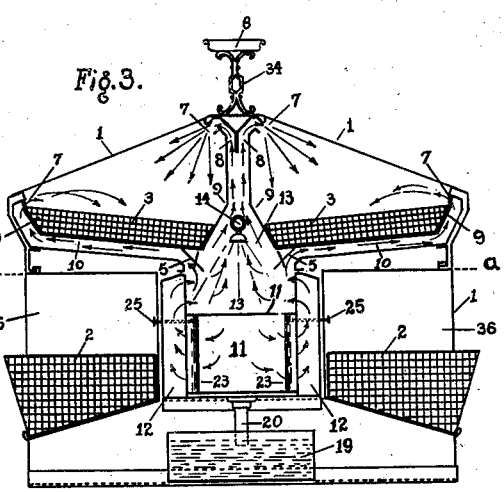
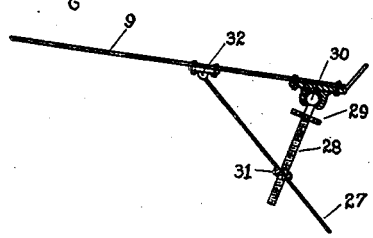
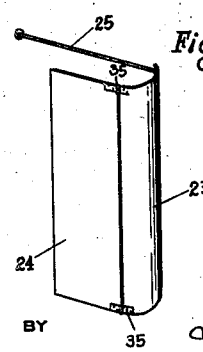
Eugene O. Wood
John W. Zuch
INVENTOR
BY Luke Williams
ATTORNEY March 6, 1934. E. O. WOOD ET AL 1,950,204
FRUIT AND VEGETABLE DISPLAY STAND
Filed May 1, 1933    3 Sheets-Sheet 3

Eugene O. Wood
John W. Zuch
INVENTOR

BY Luke Williams

ATTORNEY

Patented Mar. 6, 1934

1,950,204

UNITED STATES PATENT OFFICE 1,950,204

FRUIT AND VEGETABLE DISPLAY STAND

Eugene O. Wood and John W. Zuch, Fort Worth, Tex., assignors to New Service Manufacturing Corporation, a corporation of Texas Application May 1, 1933, Serial No. 668,760

4 Claims. (Cl. 261—117)

Our invention has reference to a device for preserving fruits and vegetables by subjecting same to a continuous application of moist-air while on display for sale.

Our principal object, is the provision of a device of this character for keeping fruits and vegetables moist and cool while on display, by means of recirculating the water with a pressure pump and spraying same downward in the form of a mist through a forced current of air, causing the air and water to become cool, thereby providing the fruits and vegetables with a sufficient amount of moisture and oxygen at a lower degree of temperature to keep them fresh and salable.

Another object of this invention is the provision of means for regulating the flow of moist-air into any desired section of the device.

Another object of this invention is the provision of a cooling unit embodying a horizontal air-distributing-chamber with means for regulating the air current therefrom.

Another important object of this invention is the provision of a device of this character, made into separate unit sections whereby each cooling unit is independent of the other, all of which are connected onto a single air-distributing-chamber.

The invention further consists in the novel features of construction, combination and operative association of parts such as is disclosed in the acompanying drawings.

In the drawings:—

Figure 1 is a perspective view of the invention.

Figure 2 is a side sectional view of the device, taken on the line 2—2 of Figure 1.

Figure 3 is a sectional end elevation, taken on the line 3—3 of Figure 1.

Figure 4 is a fragmentary plan view of the cooling unit.

Figure 5 is a perspective view of the horizontal air deflector.

Figure 6 is a perspective view of the vertical air deflector.

Figure 7:
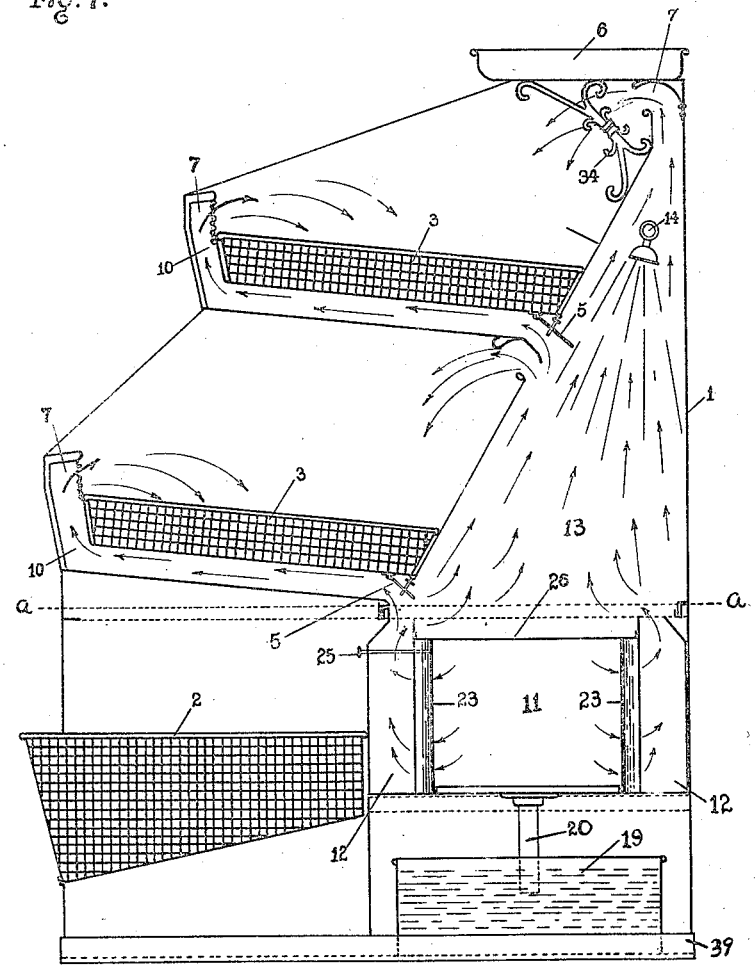
Figure 7 is an elevational end view of the single side, wall-type cooler.

As disclosed in the drawings, the numerals 1—1 represent the casing, and is preferably constructed of sheet-metal throughout which serves as a cover or housing for the device.

The double type device, shown in Figure 3, has four rows of fruit and vegetable baskets; the lower baskets being indicated by the numerals 2—2 and the plurality of upper baskets indicated by the numerals 3—3. The single type device, shown in Figure 7, has three decks of shelves, each shelf being provided with a plurality of baskets thereon, being indicated by the numerals 2 on the lower shelf and 3—3 on the upper shelves. It is suggested that the single type device be used against a wall to conserve space in places which are too crowded for the double type device. The double section device, as shown in Figure 1, may be placed in the center of a building, providing passage around the entire device.

It will be noted that the numerals 2—2, represent a plurality of baskets provided to retain fruit and vegetables which do not require a great amount of moisture, therefore the baskets 2—2 are not provided with means for a moist-air spray therein.

In Figure 2, the numerals 37 represent partitions which form several cooling sections. It will be noted that each section has a separate spray-nozzle 14 and vertical air deflector 23. Each of the several sections may be regulated independent of the other sections.

An air-distributing-chamber 11 is traversely disposed beneath each section and serves to distribute a desirable amount of air into each section. A fan 22 is provided at one end of air-distributing-chamber 11 and serves to force a currrent of air horizontally through air-distributing-chamber 11; a vertical air deflector 23, (shown plainly in Figure 6) is provided for each of the several sections and serves to deflect the air current from air-distributing-chamber 11 into air duct 12. The said vertical-air-deflector 23 is adjustable by means of adjustment rod 25 and hinges 35, secured to stationary plate 24; this serves to regulate the desired amount of air current into the different sections of the device. The cooling unit consists of a downwardly disposed spray nozzle 14 enclosed within spray chamber 13, a vertical air duct 12, an air-distributing-chamber 11 provided with fan 22. The method of acquiring the cooling effect of the air and water spray is as follows; a fine spray of water is created within spray chamber 13 by spray nozzles 14, the spray is deflected upon the top of air-distributing-chamber 11, thence (by flow of gravity) the water spray enters air duct 12, thence into air-distributing-chamber 11, thence flowing into drain pipe 20, thence into recirculating tank 19. The arrows shown in the drawings indicate the travel of the air current throughout the device which is adverse to the travel of the water mist spray. It is apparent that the air current flowing in and through the mist of water will create a cooling effect and at the same time become moist in the form of a cool moist air.

From spray chamber 13, the moist air is distributed through horizontal air ducts 10—10 and vertical air ducts 8—8, thence out through discharge openings 7—7 onto the vegetables as indicated by the arrows. It will readily be seen that the cool moist air flowing under the baskets 3—3 will further aid in keeping the vegetables cool. The air ducts 8 and 10 are enclosed by partitions 9—9.

In Figure 1, a door 4 mounted on suitable hinges and provided with a reticulated panel 38, is provided to allow access to the fan 22 and recirculating tank 19. The reticulated panel 38 is provided to permit the fan 22 to receive the desired amount of air within the device.

The wall-type device shown in Figure 7 is provided with the same cooling sections as shown in the double type machine. It will be noted that an additional shelf is provided on this device and the general construction is the same as that of the double device except for the additional shelf with the plurality of baskets 3—3 and the additional opening from spray chamber 13 into horizontal air duct 10. It is necessary to offset the cooling sections to some extent in order to make the back side straight so that the device can be placed against a wall.

Any suitable foundation may be used in the general construction of this device, but it is suggested that a framework of angle-iron be used to secure the casing thereto. The numeral 39 represents an angle-iron floor plate onto which the device is built-up and secured together.

Any desired joint may be used on the line a—a, but it is suggested that a joint be used which will not leak water, in the form of a trap.

In Figure 2, it will be noted that the device is provided with a water pressure pump 17, same being mounted upon a suitable foundation 18; an intake pipe is provided from recirculating tank 19 to pressure pump 17, indicated by numeral 16, said intake pipe 16 is supported by braces 21—21. The water in recirculating tank 19 is "picked up" by intake pipe 16 and forced under pressure by pump 17 into discharge pipe 15; thence out through spray nozzles 14—14 into spray chamber 13. It will be seen that by recirculating the water through the current of air it will reduce the temperature of the water several degrees.

The numeral 5 represents an assembled damper shown in Figure 5 and by reason of the size of the said damper 5 it is indicated by one numeral collectively in the several views. In Figure 5, the damper is shown with a gate 27 provided with swivel nut 31 and hinge 32, said hinge being secured to vent casing 9. A ball and socket joint 30 is shown connected to vent casing 9 at one end and the screw 28 engaged in swivel nut 31 at the opposite end. A knurled nut 29 is shown for adjusting the gate 27. The said damper may be adjusted to permit any desired amount of moisture upon the vegetables.

The letter (a) represents a dividing line, whereby the upper section of the device may be removed to permit access to the inside parts.

In Figure 1, the numeral 33 represents a door which is shown with a glass panel. These doors 33—33 are provided at each corner of the device to provide an opening to compartments 36 for the storage of milk, berries, eggs etc. If desired a spray may be made to enter these compartments 36 by cutting an opening between cooling chamber 12 and storage compartments 36.

A shelf 6, supported by brackets 34 is provided at the top of the device to retain fruits for display, said brackets 34 are secured to casing 1 at each end.

With our method and apparatus, it is apparent that fruits and vegetables may be kept moist and cool, and therefore preserved, and their value as a salable product retained several days longer. Our construction is comparatively simple and may be cheaply manufactured and installed with great saving of display space to the merchant.

The construction and operation of the improvement as herein set forth has reference to two forms of our device, as it is to be understood that a patent to be granted on this application is limited only to the state of the prior art, and therefore we hold ourselves entitled to such changes in form and construction as fairly fall within the scope of what we claim.

We claim:—

1. In a fruit and vegetable display stand, separate cooling sections for moistening air, each of said sections including a spray chamber having a spray nozzle, air ducts situated on each side of said cooling units and forming a part thereof, a horizontal air distributing chamber connected to each cooling section and means for forcing an air current in and through said chambers, ducts and cooling sections adverse to the travel of water spray.

2. In a fruit and vegetable display stand, a casing, means for holding vegetables or the like in said casing, a series of cooling sections for moistening air arranged in said casing, an air distributing chamber in said casing, means for forcing air into said chamber, means for deflecting said air into said sections, means in said sections for moistening said air, and ducts for distributing said moistened air to the vegetables.

3. In a fruit and vegetable display stand of the class described, separate cooling sections comprising a horizontally disposed air distributing chamber, means for forcing air into said chamber, air ducts situated on each side of said chamber for delivering air to said sections, said cooling sections including a spray chamber situated above the air distributing chamber, and means in said ducts for regulating the air currents.

4. In a fruit and vegetable display stand a casing, means for holding vegetables or the like in said casing, an air distributing chamber arranged longitudinally in said casing, separate cooling sections with means therein for moistening air arranged along said chamber, means for selectively deflecting air from said chamber into each of said sections to be moistened, and ducts for delivering said moistened air to said vegetables.

EUGENE O. WOOD.
JOHN W. ZUCH.